(12) United States Patent
Hatano et al.

(10) Patent No.: US 10,838,555 B2
(45) Date of Patent: Nov. 17, 2020

(54) POSITION OUTPUTTING DEVICE

(71) Applicant: ALPS ALPINE CO., LTD., Tokyo (JP)

(72) Inventors: Naoyuki Hatano, Miyagi (JP); Tomoki Yamada, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/785,830

(22) Filed: Feb. 10, 2020

(65) Prior Publication Data

US 2020/0257430 A1   Aug. 13, 2020

(30) Foreign Application Priority Data

Feb. 12, 2019   (JP) .................... 2019-022995

(51) Int. Cl.
  *G06F 3/041*   (2006.01)
  *G06F 3/044*   (2006.01)
(52) U.S. Cl.
  CPC ........ *G06F 3/04186* (2019.05); *G06F 3/0446* (2019.05)
(58) Field of Classification Search
  CPC .................... G06F 3/04186; G06F 3/0446
  See application file for complete search history.

(56) References Cited

U.S. PATENT DOCUMENTS

| 9,851,846 B2 | 12/2017 | Nakajima et al. |
| 10,007,382 B2 | 6/2018 | Iida et al. |
| 2016/0239131 A1* | 8/2016 | Kang ............... G06F 3/044 |
| 2016/0246423 A1* | 8/2016 | Fu .................. G06F 3/0412 |
| 2017/0220154 A1* | 8/2017 | Gotoh ............... B32B 23/08 |
| 2017/0301314 A1* | 10/2017 | Kim ................. G09G 3/3225 |
| 2018/0292698 A1* | 10/2018 | Koide ............... G06F 3/0445 |
| 2019/0138136 A1* | 5/2019 | Nakayama .......... G06F 3/0443 |
| 2019/0332242 A1 | 10/2019 | Hatano et al. |

FOREIGN PATENT DOCUMENTS

| JP | 2016-218506 | 12/2016 |
| WO | 2015/025458 | 2/2015 |
| WO | 2018/135183 | 7/2018 |

* cited by examiner

*Primary Examiner* — Andrew Sasinowski
(74) *Attorney, Agent, or Firm* — IPUSA PLLC

(57) ABSTRACT

A position outputting device that includes sensing electrodes disposed along an operational surface operated by an object, the operational surface having an operational area, the operational area having a boundary area and an inner area, a position detector configured to detect a position where the object touches the operational surface based on capacitances, the sections including first sections and second sections, the first sections being located in the inner area, the second sections being located in the boundary area, and a determiner configured to determine to output the position data in response to the peak value being detected in one of the first sections and if the difference between the peak value detected in the one of the first sections and the capacitance detected in one of the second sections neighboring the one of the first sections is not more than a predetermined value.

12 Claims, 10 Drawing Sheets

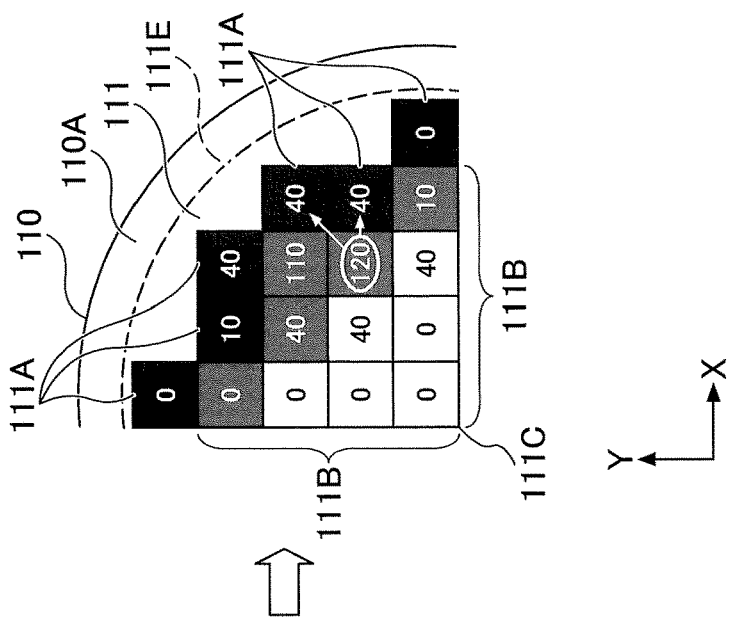
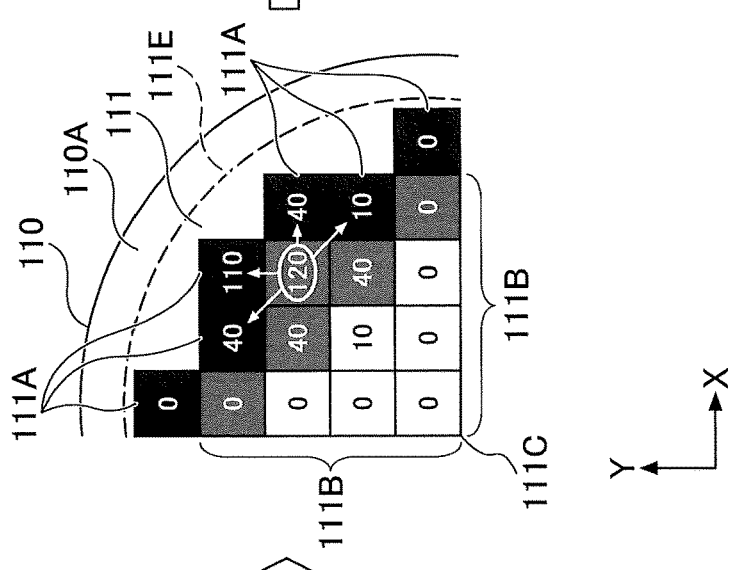
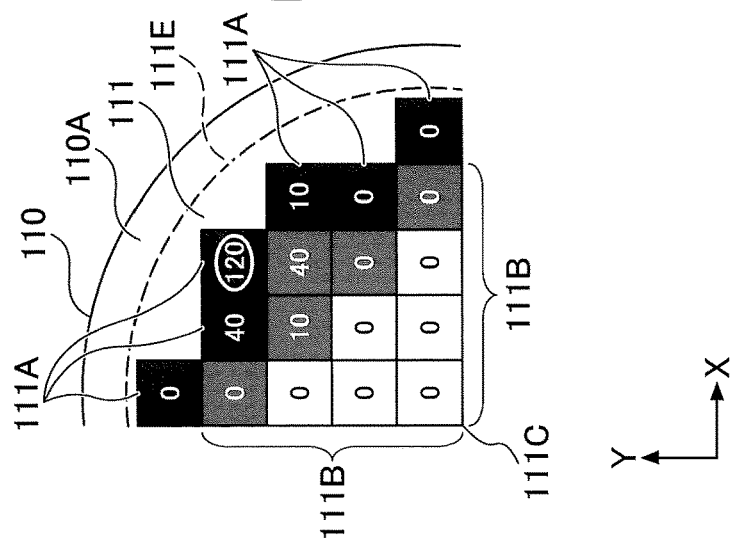

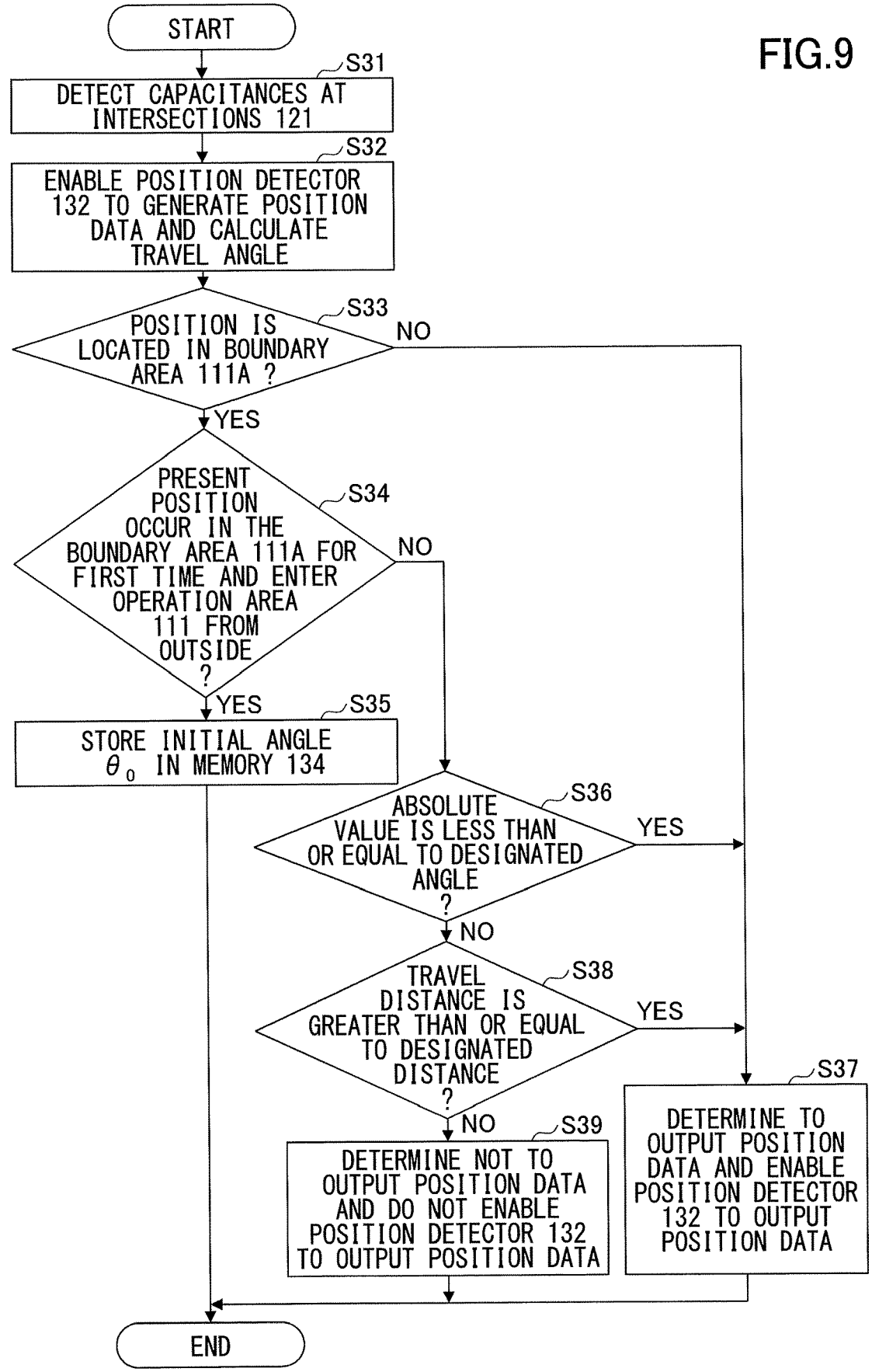

POSITION OUTPUTTING DEVICE

CROSS-REFERENCE TO RELATED APPLICATION

This patent application is based upon and claims priority to Japanese Patent Application No. 2019-022995 filed on Feb. 12, 2019, the entire contents of which are incorporated herein by reference.

FIELD

The embodiments discussed herein relate to a position outputting device.

BACKGROUND

Conventionally, there is an information processing device that includes a sensor panel that is disposed on top of a display panel and detects coordinates indicated by a user, and a controller that invalidates coordinates detected in a second region which is an outer periphery of a first region detectable by the sensor panel. (for example, see Patent Document 1).

Since the information processing device simply invalidates the coordinates (positions) detected in the second area which is the outer periphery of the first area, usability of the information processing device is not good.

RELATED-ART DOCUMENTS

Patent Documents

[Patent Document 1] Japanese Laid-open Patent Publication No. 2015-025458

SUMMARY

According to an aspect of the present application, there is provided a position outputting device that includes a plurality of sensing electrodes disposed along an operational surface operated by an object, the operational surface having an operational area, the operational area having a boundary area and an inner area, the boundary area being located within a designated range from an outer edge of the operational area, the inner area being surrounded by the boundary area, a position detector configured to detect a position where the object approaches or touches the operational surface based on capacitances obtained in a plurality of sections defined by the plurality of sensing electrodes, the sections including first sections and second sections, the first sections being located in the inner area, the second section being located in the boundary area, an output terminal configured to output position data representing the position, and a determiner configured to determine whether to output the position data from the output terminal, the determiner determining not to output the position data from the output terminal if a peak value of the capacitances is detected in one of the second section, the determiner determining to output the position data from the output terminal if the peak value is detected in one of the first sections and if the difference between the peak value detected in the one of the first sections and the capacitance detected in the one of the second sections neighboring the one of the first sections is not more than a predetermined value.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 3A is a diagram illustrating a first processing method;

FIG. 3B is a diagram illustrating the first processing method;

FIG. 3C is a diagram illustrating the first processing method;

FIG. 9 is a flowchart illustrating processes of the third processing method;

DESCRIPTION OF EMBODIMENT

Hereinafter, embodiments to which the position outputting device of the present invention is applied will be described.

Embodiment

Figure 1:
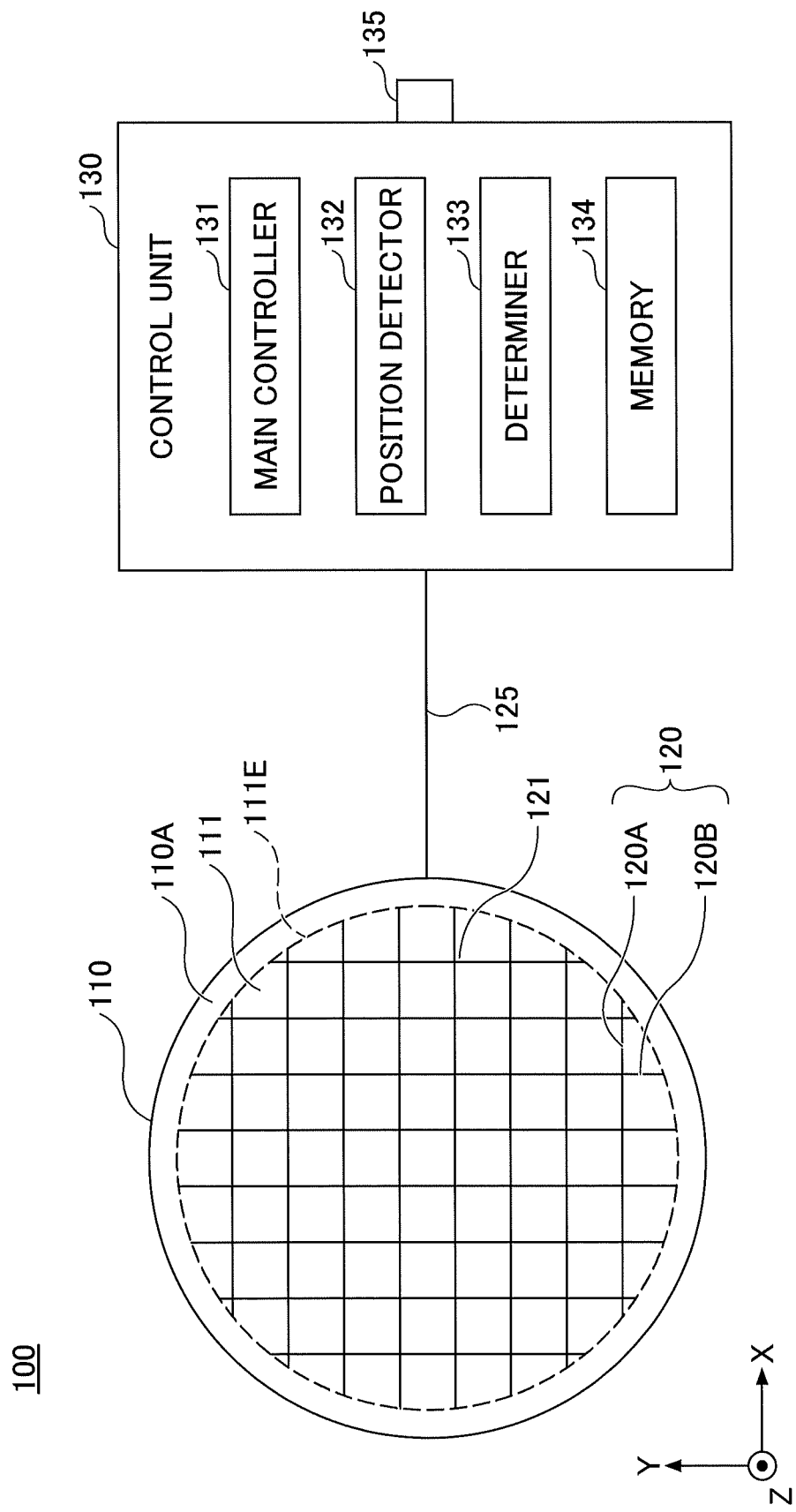
FIG. 1 is a diagram illustrating a position outputting device.

FIG. 1 is a diagram illustrating a position outputting device 100. The position outputting device 100 includes an operation panel 110, electrodes 120, and a control unit 130. Hereinafter, common XYZ coordinates will be used in each figure. The XY plane view is referred to as plan view. For the sake of convenience, the +Z direction may be referred to as up and the −Z direction is referred to as down, but it does not represent a universal vertical relationship.

The position outputting device 100 is, for example, a touch panel mounted in an input device used for remotely controlling an operation portion of a Graphic User Interface (GUI) displayed on an operation screen of various devices, such as a navigation device and an air conditioner or the like, which are mounted in a vehicle and disposed around a dashboard.

The input device has a cylindrical member that is rotatable with respect to a rotational axis parallel to the Z-axis by an operation performed by a user. The operation panel 110 of the position outputting device 100 is disposed on an upper surface of the cylindrical member (the upper surface of the cylinder). The input device in which the position outputting device 100 is incorporated is disposed on a member around a driver's seat or a passenger seat, such as, for example, a center console of the vehicle. However, an embodiment of the input device in which the position outputting device 100 is incorporated is not limited to those described above.

The position outputting device 100 outputs position data representing a position where a finger or the like of the user approaches or touches the operation panel 110 based on a change in capacitance caused when the user operates the operation panel 110. Some parts of the user's body besides fingers or the like can operate the operation panel 110, and the user can use device such as a stylus pen, for example, in order to operate the operation panel 110. Hereinafter, an embodiment in which the user operates the operation panel 110 with the finger will be described.

The operating panel 110 is a disc-like plate having an operation surface 110A and is made of resin, for example. The operation surface 110A is a top surface of the operation panel 110 and is a surface through which the user operates the output device 100. The electrodes 120 are disposed on a side (−Z-direction side) opposite to the operation surface 110A of the operation panel 110.

The operation surface 110A has an operation area 111. The operational area 111 is an area inside a dashed circle illustrated in the operation surface 110A, and is an area excluding an outer peripheral portion of the operation surface 110A. The electrodes 120 are positioned in the operation area 111 in plan view. An outer edge 111E of the operational area 111, which is indicated by the dashed circle, is a boundary between the operational area 111 and an area outside of the operational area 111.

The electrodes 120 include a plurality of electrodes 120A extending in the X direction and a plurality of electrodes 120B extending in the Y direction. The electrodes 120 are an example of sensing electrodes. The electrodes 120A and the electrodes 120B are placed at different positions with each other in the Z direction, and are spaced apart at a designated interval in the Z direction. The electrodes 120A and the electrodes 120B may be of any shapes and materials, for example, as long as made of conductive materials. In this embodiment the electrodes 120A and the electrodes 120B are made of copper, for example.

Capacitors are formed at the intersections 121 where the electrodes 120A and the electrodes 120B intersect in plan view. The intersections 121 of the electrodes 120A and the electrodes 120B are arranged in a matrix within the operation area 111. The intersections 121 are an example of sections that divide the operation area 111 into the matrix.

The electrodes 120A and the electrodes 120B are connected to the control unit 130 via cables 125. The cables 125 separately transmit potentials detected by the electrodes 120A and the electrodes 120B to the control unit 130.

The control unit 130 is implemented by a computer including a Central Processing Unit (CPU), Random Access Memory (RAM), Read Only Memory (ROM), and internal buses. The control unit 130 includes a main controller 131, a position detector 132, a determiner 133, a memory 134, and output terminals 135.

The main controller 131, the position detector 132, and the determiner 133 are illustrated as functional blocks that represent functions of a program executed by the control unit 130. The memory 134 is illustrated functionally so as to represent a memory of the control unit 130. The output terminals 135 are connected to an external device, such as an input device described above or an Electronic Control Unit (ECU) to which the input device is connected, and output the position data detected by the control unit 130 to the external device.

The main controller 131 is a processing part that controls processing of the control unit 130 and performs processing other than processing performed by the position detector 132 and the determiner 133.

The position detector 132 detects the capacitances at each of the intersections 121 based on potential differences (voltages) at each of the intersections 121. The potential differences at each of the intersections 121 are detected based on capacitances detected by the electrodes 120. The capacitances are input to the control unit 130 from the electrodes 120 through the cables 125. The position detector 132 detects a position where a finger of the user approaches or touches the operation surface 110A based on the capacitances of the intersections 121 and generates the position data representing detected positions. The position detector 132 detects the capacitances at the intersections 121 in every control cycle of the position outputting device 100 and generates the position data.

Here, the capacitances at intersections 121 vary not only when the user's finger touches the operation surface 110A, but also when the user's finger approaches the operation surface 110A. When the user's finger is not in contact with the operation surface 110A, but approaches the operation surface 110A closely, the capacitances at the intersections 121 vary in accordance with distance between the finger and the operation surface 110A.

Magnitudes of the capacitances are different in a case where the finger of the user contacts the operation surface 110A and in a case where the finger is not in contact but approaches the operation surface 110A. In both cases, the position detector 132 detects the capacitances at the intersections 121 in the same manner. Therefore, unless otherwise noted, a case where the finger of the user is in contact with the operation surface 110A will be described below.

The position detector 132 detects, for example, a position of a center of gravity of a peak value (a maximum value) of the capacitances obtained at the intersections 121 and a designated number of capacitances obtained at the intersections 121 located around and neighboring the intersection 121 providing the peak value in the XY plane, in a case where the position detector 132 detects the position where the user's finger touches the operation surface 110A. The position detector 132 outputs the position of the center of gravity as a detected position. Such a method for detecting a position is an example, various other methods may be used to detect a position.

The determiner 133 determines whether to output the position data representing the position detected by the position detector 132 from the output terminals 135 to the outside of the position outputting device 100 based on the capacitances detected by the electrodes 120 and input through the cables 125.

If the determiner 133 determines to output the position data from the output terminals 135, the position detector 132 outputs the position data to the output terminals 135. As a result, the position data is output to the input device or to the external device such as an ECU that is connected to the output terminals 135.

If the determiner 133 determines not to output the position data from the output terminals 135, the position detector 132 does not output the position data to the output terminals 135. As a result, the position data is not output from the output terminals 135.

The memory 134 stores programs and data used by the main controller 131, the position detector 132, and the determiner 133 when executing the processing.

Figure 2:
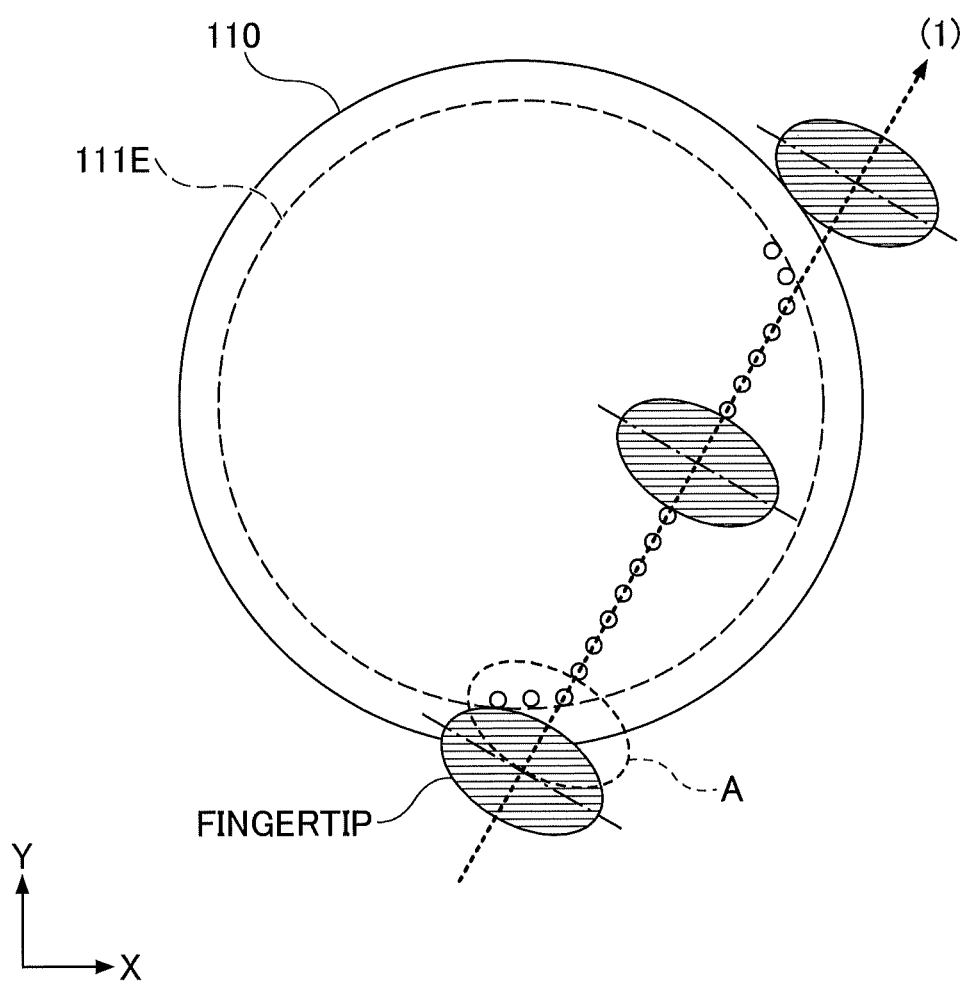
FIG. 2 is a diagram illustrating a reason for a deviation of position data in an outer edge of an operation area.

Next, positional deviation of the position detector 132 occurred at the outer edge 111E of the operation area 111 will be described with reference to FIG. 2. FIG. 2 is a diagram illustrating a reason for a deviation of the position data in the outer edge 111E of the operation area 111. In FIG. 2, white circles represent the positions detected by the position detector 132. The fingertip illustrated as a hatched oval is moved along the arrow (1) while contacting the operation panel 110.

Since the operation panel 110 is circular in plan view, the outer edge (boundary) 111E of the operation area 111 is also circular. Thus, the intersections 121 are placed in a staggered-like manner along the outer edge 111E of the operation area 111.

If the entire fingertip is in contact with the operation panel 110, the maximum value (the peak value) of the capacitances of all intersections 121 detected is obtained at a position where the approximate center of the fingertip is in contact. Since the peak value of the capacitances has a significant effect on the center of gravity, the position detected by the position detector 132 is very close to the position of the intersection 121 that provides the peak value of the capacitances in a case where the entire fingertip is in contact with the operation panel 110.

Thus, when the fingertips are moved from the outer peripheral portion to an inside of the operational area 111 while contacting with the operating panel 110, the peak value of the detected capacitances in the X-axis and/or Y-axis direction may deviate (or shift) with respect to the peak value of the detected capacitances in the X-axis and/or Y-axis direction when the entire fingertip is in contact with the operating panel 110.

As a result, when the fingertip overlaps the outer edge 111E of the operation area 111 as illustrated by the dashed line A in FIG. 2, the position detected by the position detector 132 may be deviated in the X-axis direction and/or the Y-axis direction compared to a case where the entire fingertip is in contact with the operation panel 110. When the fingertip overlaps the outer edge 111E, a portion of the fingertip that provides the peak value of the capacitances in a case where the entire fingertip is in contact with the operation panel 110 may be outside of the operation area 111. Such positional deviation particularly becomes pronounced when a traveling direction of the fingertip is not along a radial direction of the operation panel 110. The radial direction is equal to a direction that passes through a center 111C of the operation area 111.

Therefore, even when the fingertip travels straight while contacting with the operation panel 110, detected trajectory of the fingertip is bent when the fingertip overlaps the outer edge 111E. If the detected trajectory is bent, the user may not be able to perform the operation as expected.

The position outputting device 100 improves usability by suppressing a defect caused by the bend of the trajectory of the fingertip as described above and outputting the position data when a designated operation is performed by the user.

Hereinafter, four kinds of processing (a first processing method through a fourth processing method) of the position outputting device 100 will be described in detail. The position outputting device 100 performs one of the first processing method through the fourth processing method.

FIGS. 3A to 3C are diagrams illustrating the first processing method. FIGS. 3A to 3C illustrate values of the capacitances of the intersections 121 detected by the position detector 132 in a quadrant of the operation area 111. The values are illustrated in sections corresponding to the intersections 121. Positions of the sections correspond to the intersections 121. Also, for simplicity of explanation, each of the sections illustrated by a matrix square in FIGS. 3A to 3C may be referred to as the intersection 121. The values of the capacitances are normalized values, and even when the value is zero, some capacitance value is actually obtained.

In FIGS. 3A to 3C, for example, the capacitances are illustrated when the fingertip is traveling from the outside of the operation area 111 to the inside of the operation area 111 in the +Y direction while contacting the operation panel 110. The capacitances illustrated in FIGS. 3A to 3C were acquired in three successive control cycles.

In FIGS. 3A and 3B, the entire fingertip does not contact the operating panel 110, and there are portions of the fingertip that protrudes outside of the operational area 111. In FIG. 3C, the entire fingertip is placed in the operation area 111.

Among the intersections 121 arranged in the matrix, the intersections 121 located at an outermost side and closest to the outer edge 111E of the operation area 111 (the intersections 121 illustrated in dark gray) are the intersections 121 included in a boundary area 111A. The boundary area 111A is located within a designated range from the outer edge 111E of the operational area 111 in a direction from the outer edge 111E to the center 111C of the operation area 111. The operation area 111 includes the boundary area 111A and an inner area 111B. The inner area 111B is located on the inner side of the boundary area 111A and is surrounded by the boundary area 111A.

Since the designated range corresponds to a single intersection 121 from the outer edge 111E, FIGS. 3A through 3C illustrate the boundary area 111A placed in staggered-like manner along the outer edge 111E of the operation area 111. For example, the boundary area 111A illustrated in FIG. 3A includes the six intersections 121 having detected values 0, 40, 120, 10, 0, and 0, respectively. The boundary area 111A may be an area corresponding to the two or more intersections 121 from the outer edge 111E.

In FIG. 3A, the peak value of the capacitances of all intersections 121 is the maximum value (120) of each of the detected values (i.e., 0, 10, 40, and 120) illustrated in each intersection 121 and is obtained at the intersection 121 that is circled in the boundary area 111A illustrated in dark gray. FIG. 3A corresponds to a situation where the entire fingertip is not in contact with the operation panel 110, and a portion close to the center of the fingertip is in the boundary area 111A.

The position outputting device 100 does not output the position data when the peak value of the capacitances is obtained at the intersection 121 within the boundary area 111A. This is because, as noted above, positional deviation may occur.

In FIG. 3B, the peak value of the capacitances has traveled (moved) inward (center 111C of the operation area 111) with respect to the boundary area 111A illustrated in dark gray. In other words, the peak value of the capacitances is traveled (moved) into the inner area 111B. The position of the fingertip is moved in the −Y direction compared with that of FIG. 3A, but the entire fingertip is not considered to be in contact with the operation panel 110 because a value (110) close to the peak value is obtained in the boundary area 111A.

In this case, the position outputting device 100 calculates differences between the peak value and each capacitance (40, 110, 40, and 10) obtained in the neighboring intersections 121 of an intersection 121 providing the peak value within the boundary area 111A. In FIG. 3B, the four neighboring intersections 121 of the intersection 121 providing the peak value (120) are indicated by four arrows. Then the position outputting device 100 determines whether a minimum value of the differences is greater than or equal to a predetermined value, i.e., the threshold value. The predetermined value is 50 as an example. It should be noted that the neighboring intersections 121 of the intersection 121 providing the peak value within the boundary area 111A are intersections 121 within the boundary area 111A sharing a common edge or corner with the intersection 121 providing the peak value.

In FIG. 3B, the four differences are 80 (=120−40), 10 (=120−110), 80 (=120−40), and 110 (=120−10) with the minimum value of 10 which is not more than a predetermined value (50). Therefore, the position outputting device 100 does not output the position data.

The reason for calculating the differences between the peak value and the capacitances of the intersections 125 neighboring the intersection 121 providing the peak value within the boundary area 111A as illustrated in FIG. 3B is as follows. If the entire fingertip is not in contact with the operation panel 110, an edge of the fingertip is considered to be located in the center 111C side of the operation area 111, and a center portion of the fingertip may be located outside of the boundary area 111A.

In FIG. 3C, the peak value of the capacitances has traveled (moved) further inward with respect to the boundary area 111A illustrated in dark gray. The position of the fingertip is moved further in the −Y direction relative to the position in FIG. 3B. Since the capacitance obtained at the intersection 121 that is located in the boundary are 111E and is neighboring the intersection 121, i.e., in the +Y direction, providing the capacitance (110) close to the peak value is reduced to 40, the entire fingertip is considered to be in contact with the operation panel 110.

In this case, the position outputting device 100 calculates differences between the peak value and each of the capacitances (40, 40) obtained in the two intersections 121 located in the boundary area 111E. As illustrated in FIG. 3C, the two intersections 121 located in the boundary area 111E as illustrated by arrows are located neighboring the intersection 121 providing the peak value (120) of the capacitances. The position outputting device 100 determines whether a minimum value of the differences is greater than or equal to a predetermined value (a threshold value).

In FIG. 3C, the two differences are both 80 (=120−40) and the minimum value 80 is more than the predetermined value (50). Accordingly, the position outputting device 100 outputs the position data.

Figure 4:
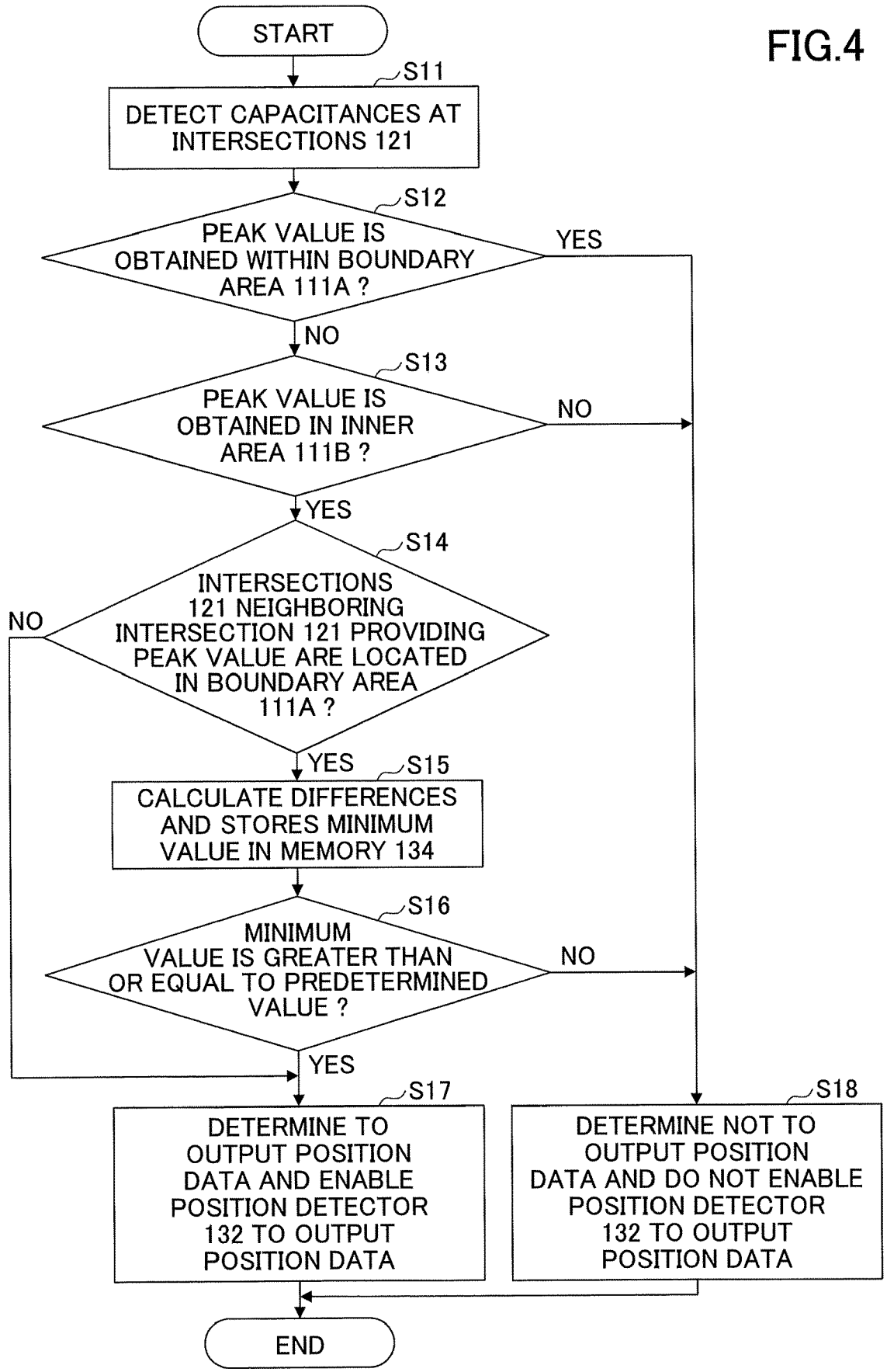
FIG. 4 is a flowchart illustrating the first processing method.

FIG. 4 is a flowchart illustrating the first processing method.

As processes start, the position detector 132 detects the capacitance at each of the intersections 121 (step S11).

The determiner 133 determines whether the peak value of the capacitances is obtained within the boundary area 111A (step S12).

If the determiner 133 determines that the peak value of the capacitances is not obtained within the boundary area 111A (S12: NO), the determiner 133 determines whether the peak value is obtained in the inner area 111B (step S13).

If the determiner 133 determines that the peak value of the capacitances is obtained within the inner area 111B (S13: YES), the determiner 133 determines whether the one or more intersections 121 neighboring the intersection 121 that provides the peak value are within the boundary area 111A (step S14).

If the determiner 133 determines that the intersection 121 neighboring the intersection 121 that provides the peak value is located in the boundary area 111A (S14: YES), the determiner 133 calculates differences between the capacitances obtained at the intersections 121 that are located in the boundary area 111A and that are neighboring the intersection 121 providing the peak value and the peak value, and stores a minimum value among the differences in the memory 134 (step S15).

The determiner 133 reads out the minimum value of the differences from the memory 134 and determines whether the minimum value of the difference is greater than or equal to a predetermined value, i.e., a threshold value (step S16).

If the determiner 133 determines that the minimum value of the differences is greater than or equal to the predetermined value, i.e., the threshold value (S16: YES), the determiner 133 determines to output the position data and enables the position detector 132 to output the position data from the output terminals 135 (step S17). Since the position detector 132 generates the position data based on the capacitance obtained from each intersection 121 in each control cycle, the position data is output from the output terminals 135 in step S17.

When the process in step S17 is completed, the main controller 131 ends the processes in the current control cycle (END). In the next control cycle, the processes start from the START.

If the determiner 133 determines in step S14 that an intersection(s) 121 neighboring the intersection 121 that provides the peak value is not located in the boundary area 111A (S14: NO), the determiner 133 proceeds the flow to step S17 and determines to output the position data, and enables the position detector 132 to output the position data from the output terminals 135 (step S17).

The peak value is therefore obtained at an intersection 121 that is located in the inner area 111B and that are not neighboring an intersection 121 located in the boundary area 111A. In other words, in this case, the peak value is obtained at the intersection 121 that is located inner side with respect to the five intersections 121 that are illustrated in thin gray in the inner area 111B in FIGS. 3A to 3C. Accordingly, the position outputting device 100 outputs the position data, since the entire fingertip is considered to be within the operation area 111.

If the determiner 133 determines in step S12 that the peak value of the capacitances is obtained in the boundary area 111A (S12: YES), the determiner 133 determines not to output the position data and does not enable the position detector 132 to output the position data from the output terminals 135.

When the process in step S18 is completed, the main controller 131 ends the processes in the current control cycle (END). In the next control cycle, the processes start from the START.

If the determiner 133 determines in step S13 that the peak value of the capacitances is not obtained in the inner area 111B (S13: NO), the determiner 133 determines not to output the position data and does not enable the position detector 132 to output the position data from the output terminals 135.

If the determiner 133 determines in step S16 that the minimum value of the differences is not greater than or equal to the predetermined value i.e., the threshold value (S16: NO), the determiner 133 determines not to output the position data and does not enable the position detector 132 to output the position data from the output terminals 135 (step S18).

As described above, the position outputting device 100 does not output the position data if the intersection 121 that provides the peak value of the capacitances is located in the boundary area 111A. The position outputting device 100 outputs the position data, if the intersection 121 that provides the peak value is located in the inner area 111B, the intersection 121 neighboring the intersection 121 that provides the peak value is located in the boundary area 111A, and the difference is greater than the predetermined value, i.e., the threshold value. In this case, the center of the fingertip is located in the operational area 111, and deviation in the position of the center of gravity obtained by the position detector 132 is very unlikely to occur. Therefore, the position outputting device 100 outputs the position data.

Therefore, the position outputting device 100 can output the position data even if the fingertip is located near the outer edge 111E of the operation area 111.

Accordingly, it is possible to provide the position outputting device 100 that can be used conveniently.

If the entire fingertip is located in the operation area 111, the position outputting device 100 proceeds the flow from step S14 to step S17 and outputs the position data. Accordingly, the position outputting device 100 is very convenient when the entire fingertip is located in the operation area 111.

Figure 5A:
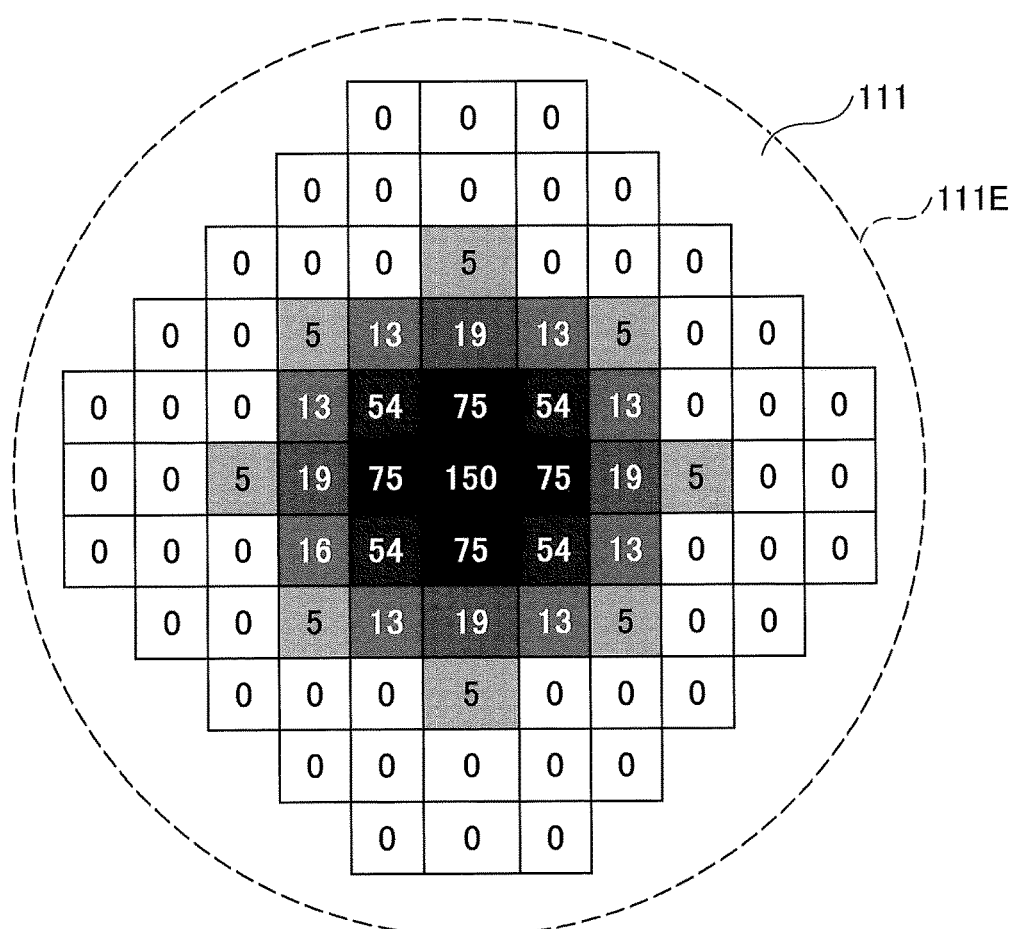
FIG. 5A is a diagram illustrating total values and weighted average values used in a second processing method.
Figure 5B:
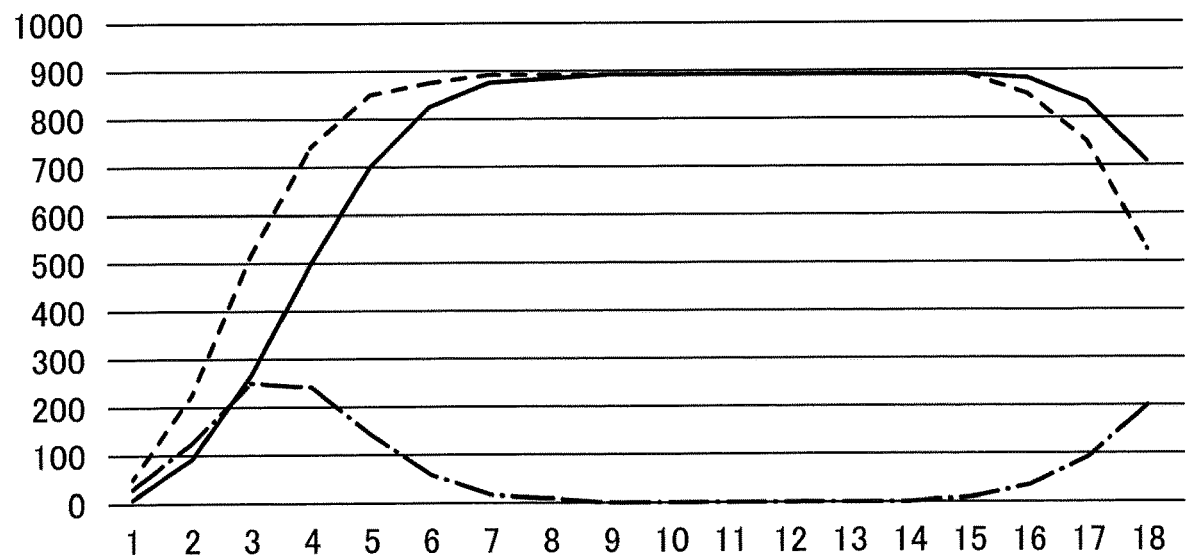
FIG. 5B is a diagram illustrating the total values and the weighted average values used in the second processing method.

Next, a second processing method will be described. FIGS. 5A and 5B are diagrams illustrating total values and weighted average values used in the second processing method.

In the second processing method, the position outputting device 100 determines not to output the position data from the output terminals 135, if a difference between a sum and a weighted average value is greater than a predetermined value. If the difference is less than or equal to the predetermined value, the position outputting device 100 determines to output the position data from the output terminals 135. The sum is obtained by adding the peak value of the capacitances and the capacitances obtained at the eight intersections 121 neighboring the intersection 121 providing the peak value. The weighted average value is obtained by adding the sum at a previous control cycle and the sum at the current control cycle by a designated weight with respect to the respective sums.

In other words, the sum is calculated by adding the capacitances obtained at the nine intersections 121 including the centered intersection 121 providing the peak value (150) of the capacitances, as illustrated in FIG. 5A. The nine intersections 121 are provided in a manner such that three intersections 121 are arranged in the X direction and three intersections 121 are arranged in the Y direction. In FIG. 5A, the four capacitances of 54 and the four capacitances of 75 are obtained at the eight intersections 121 neighboring the intersection 121 providing the peak value (150).

In a case where the intersection 121 providing the peak value of the capacitances is located closest to the outer edge 111E of the operational area 111, there is no set of 3×3 intersections 121 centered on the intersection 121 providing the peak value, and the number of intersections 121 neighboring the intersection 121 providing the peak value is 7 or less. In this case, the sum is calculated by adding the peak value and the capacitances obtained at the neighboring seven or fewer intersections 121. It should be noted that a neighboring intersection 121 of the intersection 121 providing the peak value is an intersection 121 sharing a common edge or corner with the intersection 121 providing the peak value.

The weighted average value is a weighted average value obtained by adding the sum of the previous control cycle (one cycle before) and the sum of the current control cycle by the designated weight distributed with respect to the respective sums. For example, if the weight of the sum of the previous control cycle is greater than the weight of the sum of the current control cycle, the weighted average value will be a value that is more affected by the sum of the previous control cycle. Conversely, if the weight of the sum of the previous control cycle is less than the weight of the sum of the current control cycle, the weighted average will be less affected by the sum of the previous control cycle.

When the position of the fingertip overlaps the outer edge 111E of the operation area 111 and the entire fingertip is not located in the operation area 111, the sum becomes relatively low, because the number of the intersections 121 neighboring the intersection 121 providing the peak value is small as described above.

Therefore, according to the second processing method, the position outputting device 100 determines not to output the position data from the output terminals 135 if the difference between the sum of the current control cycle and the weighted average value is greater than the predetermined value, and determines to output the position data from the output terminals 135 if the difference is less than or equal to the predetermined value.

In this method, if the position of the fingertip overlaps the outer edge 111E and the entire fingertip is not located in the operational area 111, the difference becomes larger. If the entire fingertip is located in the operational area 111, the difference becomes smaller.

In FIG. 5B, the horizontal axis represents a position in the X direction or the Y direction. As the position in the horizontal axis becomes closer to a left end or a right end, the position of the fingertip becomes closer to the outer edge 111E of the operational area 111. In FIG. 5B, a vertical axis represents the capacitance. In FIG. 5B, a dashed line represents the sum, a solid line represents the weighted average, and a single dashed line represents the difference between the sum and the weighted average.

As illustrated in FIG. 5B, it can be understood that the difference between the sum and the weighted average value becomes greater at both ends, i.e., the left end and the right end, near the outer edge 111E of the operation area 111.

A distribution of the weight of the sum of the previous control cycle and the weight of the sum of the current control cycle may be set depending on, for example, a size of the operation panel 110 in plan view, a pitch of the electrodes 120A (a distance between the electrodes 120A that are neighboring with each other), and a pitch of the electrodes 120B (a distance between the electrodes 120B that are neighboring with each other).

If the entire fingertip is not located in the operational area 111, the difference between the sum of the current control cycle and the weighted average value becomes greater as the weight of the sum of the previous control cycle becomes greater relative to the weight of the sum of the current control cycle.

In addition, if the entire fingertip is not located in the operational area 111, the difference between the sum of the current control cycle and the weighted average value becomes smaller as the weight of the sum of the previous control cycle becomes smaller relative to the weight of the sum of the current control cycle.

Accordingly, the position outputting device 100 sets the predetermined value to a greater value in accordance with the weight of the sum of the previous control cycle being greater relative to the weight of the sum of the current control cycle.

Figure 6:
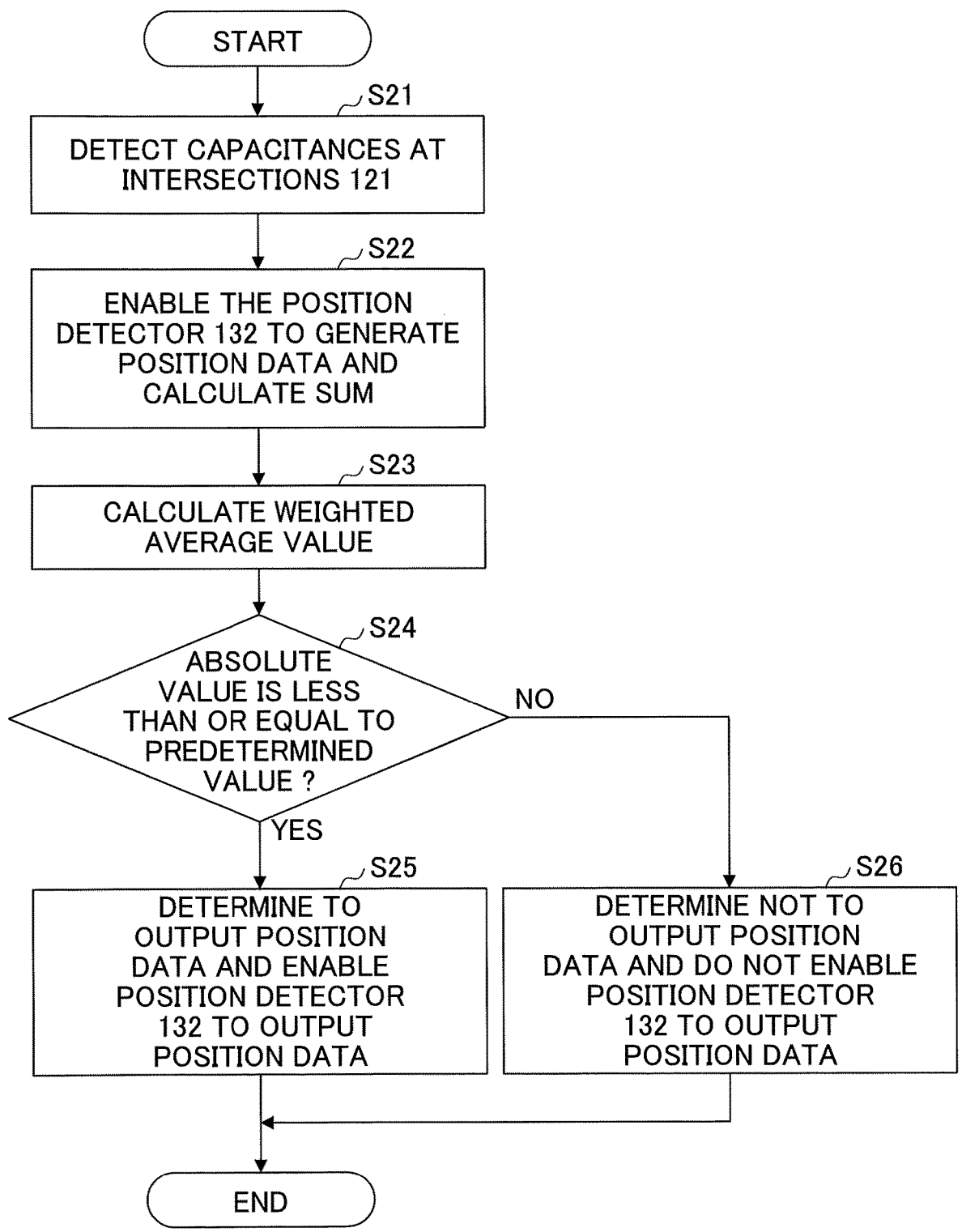
FIG. 6 is a flowchart illustrating processes of the second processing method.

FIG. 6 is a flowchart illustrating processes of the second processing method.

As the processes start, the position detector 132 detects the capacitances obtained at each of the intersections 121 (step S21).

The determiner 133 enables the position detector 132 to generate the position data and calculates the sum centered on the peak value of the capacitances (step S22).

The determiner 133 calculates the weighted average value obtained by adding the sum of the previous control cycle and the sum of the current control cycle with the designated weight (step S23).

The determiner 133 determines whether an absolute value of a value obtained by subtracting the weighted average value calculated in step S23 from the sum calculated in step S22 is less than or equal to the predetermined value, i.e., the threshold value (step S24).

If the determiner 133 determines that the absolute value of the subtracted value is less than or equal to the predetermined value, i.e., the threshold value (S24: YES), the determiner 133 determines to output the position data and enables the detector 132 to output the position data from the output terminals 135 (step S25).

If the process in step S25 is completed, the main controller 131 ends the processes in the current control cycle (END). In a next control cycle, the processes starts from the START.

If the determiner 133 determines that the absolute value of the subtracted value is not less than the predetermined value (S24: NO), the determiner 133 determines not to output the position data and does not enable the position detector 132 to the output the position data from the output terminals 135 (step S26).

If the process in step S26 is completed, the main controller 131 ends the processes in the control cycle (END). In a next control cycle, the processes start from the START.

As described above, the position outputting device 100 determines whether the fingertip is located at the outer edge 111E of the operation area 111 or whether the entire fingertip is located in the operation area 111 based on the difference between the sum and the weighted average value. The position output unit 100 determines whether to output the position data based on a determination result with respect to the position of the fingertip as described above.

Even in a case where the fingertip is close to the outer edge 111E of the operation area 111, the position output unit 100 determines to output the position data if the difference between the sum and the weighted average value is less than or equal to the predetermined value. In this case, since the center of the fingertip is located in the operational area 111 and the center of gravity obtained by the position detector 132 is very unlikely to be displaced, the position output unit 100 outputs the position data.

Therefore, the position outputting device 100 can output the position data even if the fingertip is near the outer edge 111E of the operation area 111.

Accordingly, it is possible to provide the position outputting device 100 that can be used conveniently.

Figure 7:
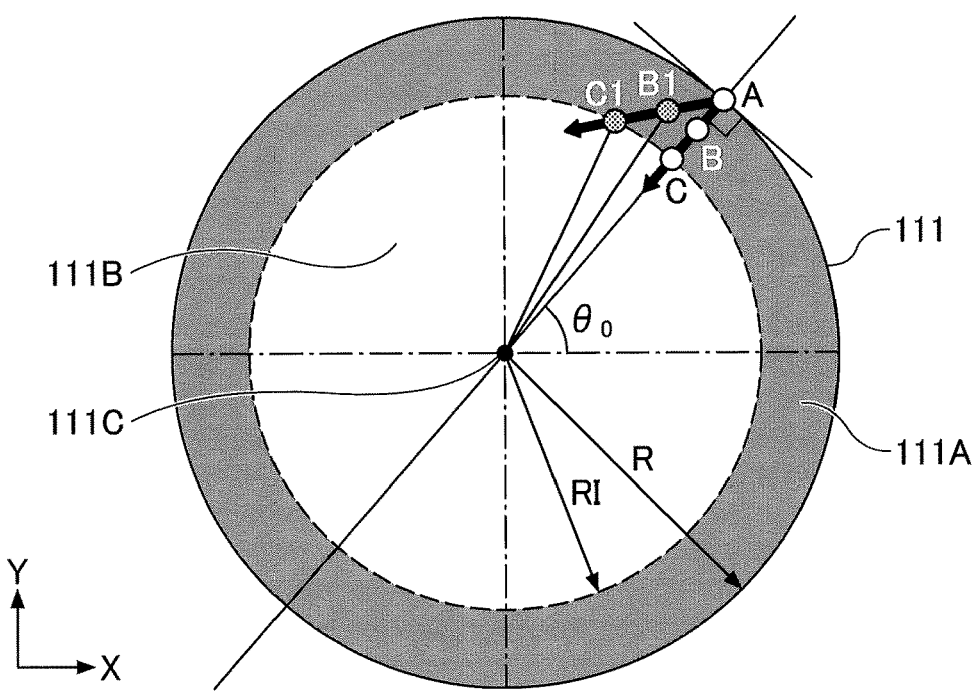
FIG. 7 is a diagram illustrating an angle which is calculated by a determiner according to a third processing method.

Next, a third processing method will be described. FIG. 7 is a diagram illustrating an angle which is calculated by the determiner 133 based on the third processing method. FIG. 7 illustrates the operation area 111 and the center 111C of the operation area 111. Further, FIG. 7 illustrates an annular region (region illustrated in gray) The annular region is the boundary area 111A. The boundary area 111A is the annular region that is a distance RI or more from the center 111C.

A width (a width in a radial direction) of the boundary area 111A is set to be a width so that the position of the fingertip is detected at least two or more times by the position detector 132 at an average operation speed of a user. This is so as to enable the position outputting device 100 to detect the position of the fingertip in contact with the operation panel 110 from the outside of the operation area 111 more than once within the boundary area 111A.

As illustrated in FIG. 7, it is assumed that the position of the fingertip detected by the position detector 132 travels from a point A (X0,Y0) on the outer edge 111E to a point C (X2,Y2) via a point B (X1,Y1). Coordinates of the center 111C are (0, 0).

An angle $\theta_0$ is an angle of a straight line connecting point A (X0,Y0) and center 111C (0,0) passing through the center 111C (0,0) and parallel to the X axis. The angle $\theta_0$ is calculated as $\theta 0 = \tan^{-1}$ (Y0/X0). The angle $\theta_0$ is an initial angle to the center 111C(0,0) of the position in a case where the fingertip position enters the operation area 111 from the outside of the operation area 111. The angle $\theta_0$ is stored in the memory 134.

A travel angle 91 is an angle of a direction in which the detected position travels from point A (X0,Y0) to point B (X1,Y1) with respect to a straight line that is parallel to the X axis and is passing through center 111C (0,0). The travel angle $\theta 1$ is calculated as $\theta 1 = \tan^{-1}$ (Y0−Y1/X0−X1).

A travel angle $\theta 2$ is an angle of a direction in which the detected position travels from point B (X1, Y1) to point C (X2, Y2) with respect to the straight line that is parallel to the X axis and is passing through center 111C (0, 0). The travel angle $\theta 2$ is calculated as $\theta 2 = \tan^{-1}$ (Y1−Y2/X1−X2).

If the position of the fingertip enters the operational area 111 at the initial angle Go and travels from point A to point C via point B, the direction of the travel of the fingertip is perpendicular to a tangent at the outer edge 111E. In this case, a trajectory of the detected position is along the radial direction of the operating panel 110 until the entire fingertip enters the operational area 111 after a part of the fingertip enters the operational area 111. Therefore, in this case, it is unlikely that the detected position will be misaligned. However, if the fingertip travels in a direction different from the initial angle $\theta_0$, for example, from point A to points B1 and then to point C1, the positional deviation of the position detector 132 as described with reference to FIG. 2 is likely to occur.

For this reason, in the third processing method, if an absolute value of the difference between the initial angle $\theta_0$ and the travel angle is greater than a designated angle (a threshold angle), the position outputting device 100 does not output the position data. If the absolute value of the difference between the initial angle $\theta_0$ and the travel angle is less than or equal to the designated angle, the position outputting device 100 outputs the position data.

Further, the position outputting device 100 exceptionally outputs the position data even if the difference between the travel angle and the initial angle $\theta_0$ is greater than the designated angle (the threshold angle) in the following case.

Figure 8:
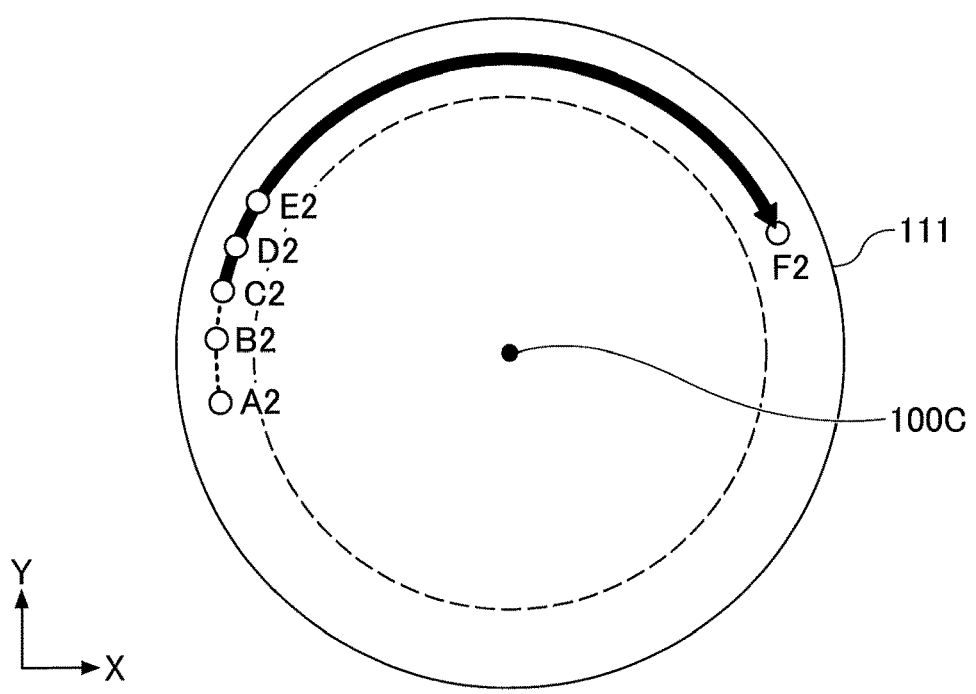
FIG. 8 is a diagram illustrating a case of exceptionally outputting the position data according to the third processing method.

FIG. 8 is a diagram illustrating a case of exceptionally outputting the position data according to the third processing method.

As illustrated in FIG. 8, if the position detected by the position detector 132 travels continuously for a certain distance from point A2 to point B2, point C2, point D2, point E2, and point F2, it is considered that the user intentionally performs such an operation. Continuous travel from point A2 to points B2, C2, D2, E2, and F2 is an operation performed after the travel angle with respect to the initial angle $\theta_0$ becomes greater than the designated angle (the threshold angle).

In such a case, the position outputting device 100 exceptionally outputs the position data. For example, even if the position outputting device 100 determines to output the position data at points A2 and B2, the position outputting device 100 determines to output the position data when the detected position travels from points C2 through points D2 and E2 to point F2. In other words, the position outputting device 100 determines to output the position data while the detected position is traveling from points C2 through points D2, E2, and F2.

FIG. 9 is a flowchart illustrating processes of the third processing method.

As the processes start, the position detector 132 detects the capacitances at each of the intersections 121 (step S31).

The determiner 133 enables the position detector 132 to generate the position data and calculates the travel angle (step S32). The travel angle is calculated as the initial angle $\theta_0$ when the fingertip enters the operation area 111 from outside of the operation area 111. After the fingertip enters the operation area 111, the travel angle is calculated as an angle of a direction of the fingertip traveling from the position detected in the previous control cycle to the position detected in the current control cycle with respect to the straight line that passes through the center 111C (0,0) and is parallel to the X-axis The determiner 133 determines whether the position represented by the position data generated by the position detector 132 at step S32 is located in the boundary area 111A (step S33).

If the determiner 133 determines that the position is located in the boundary area 111A (S33: YES), the determiner 133 determines whether the present position occurs in the boundary area 111A for a first time and enters the operation area 111 from the outside of the operation area 111 (step S34). The determiner 133 may determine that the present position occurs in the boundary area 111A for the first time and enters the operation area 111 from the outside of the operation area 111, if a state in which the position is detected for the first time on the outer edge 111E of the operational area 111 is changed from a state in which the position is not detected by the position detector 132.

If the determiner 133 determines that the present position occurs in the boundary area 111A for the first time and enters the operation area 111 from the outside of the operation area 111 (S34: YES), the determiner 133 stores the initial angle $\theta_0$ calculated in step S32 in the memory 134 (step S35).

When the process in step S35 is completed, the main controller 131 ends the processes in the current control cycle (END). In a next control cycle, the processes starts from the START.

The determiner 133 performs following processes in step S36 if the determiner 133 determines that the position does not occur in the boundary area 111A for the first time or that the position data does not enter the boundary area 111A from the outside of the operation area 111 (S34: NO) after a certain condition. The certain condition is that, in a subsequent control cycle after the control cycle in which the initial angle $\theta_0$ is stored in the memory 134, the position detector 132 detects the capacitances of the intersections 121 at step S31, the determiner 133 enables the position detector 132 to generate the position data and calculates the travel angle at step S32, and the determiner 133 determines that the position is located in the boundary area 111A (S33: YES).

The determiner 133 determines whether the absolute value of the value obtained by subtracting the initial angle $\theta_0$ from the travel angle calculated in step S32 is less than or equal to the designated angle (the threshold angle) (step S36).

If the determiner 133 determines that the absolute value of the subtracted value is less than or equal to the designated angle (S36: YES), the determiner 133 determines to output the position data and enable the position detector 132 to output the position data from the output terminals 135 (step S37).

If the process in step S37 is completed, the main controller 131 ends the processes in the current control cycle (END). In a next control cycle, the processes starts from the START.

If the determiner 133 determines in step S36 that the absolute value of the subtracted value is not less than or equal to the designated angle (angular threshold value) (S36: NO), the determiner 133 determines whether the travel distance of the positions detected by the position detector 132 over one or more control cycles after determining that the present position occurs in the boundary area 111A for the first time and enters the operation area 111 from the outside of the operation area 111 is greater than or equal to a designated distance (a threshold distance) (step S38). The designated distance (the threshold distance) can be set to an appropriate distance at which the user intentionally moves his or her finger.

If the determiner 133 determines that the travel distance is greater than or equal to the designated distance (the threshold distance) (S38: YES), the main controller 131 proceeds the flow to step S37. The determiner 133 enables the position detector 132 to output the position data from the output terminals 135 (step S37).

In a case where the flow proceeds from step S38 to step S37, the user is intentionally moving his or her finger, as illustrated in FIG. 8. FIG. 8 illustrates the user's operation of scrolling along the outer edge 111E of the operation area 111 within the boundary area 111A. However, the user's operation may be performed within the inner area 111B. The user's operation may be performed so that the detected position straddles the boundary area 111A and the inner area 111B.

If the determiner 133 determines in step S38 that the travel distance is not more than or equal to the designated distance (the threshold distance) (S38: NO), the determiner 133 determines not to output the position data and does not enable the position detector 132 to output the position data from the output terminals 135 (step S39).

If the process in step S37 is completed, the main controller 131 ends the processes in the current control cycle (END). In a next control cycle, the processes starts from the START.

As described above, in the third processing method, the position outputting device 100 calculates the travel angle which is obtained from movement of the positions detected by the position detector 132 within the boundary area 111A, and calculates the absolute value of the difference between the travel angle and the initial angle.

If the absolute value of the difference is greater than the designated angle (the threshold angle), the position outputting device 100 does not output the position data. The position outputting device 100 outputs the position data if the absolute value of the difference is less than or equal to the designated angle (the threshold angle). This is because, if the direction of the travel is toward the center 111C side of the operation area 111, the misalignment is reduced even though the position outputting device 100 outputs the position data.

Therefore, the position outputting device 100 can output the position data even when the fingertip is located near the outer edge 111E of the operation area 111.

Accordingly, it is possible to provide the position outputting device 100 that can be used conveniently.

Figure 10A:
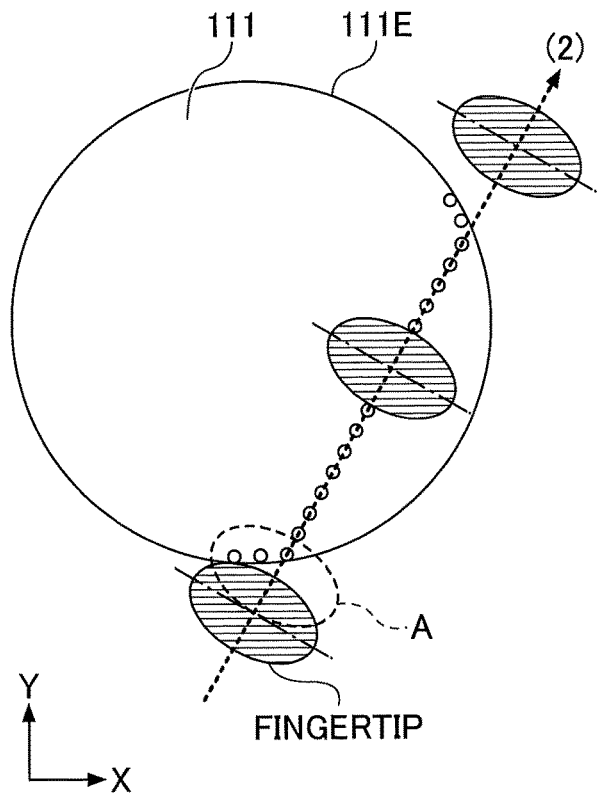
FIG. 10A illustrate a width of an area where fingertip contacts an operation panel.
Figure 10B:
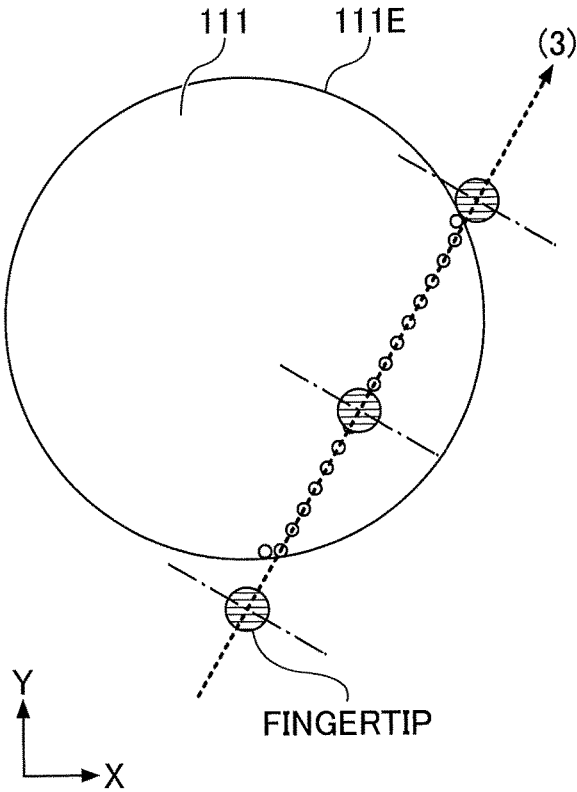
FIG. 10B illustrate a width of an area where fingertip contacts an operation panel.

Next, a fourth processing method will be described. FIGS. 10A and 10B illustrate a width of an area where the fingertip contacts the operation panel 110 and a threshold of the width. The fourth processing method is a method in which a determination based on the width of the area where the fingertip contacts the operation panel 110 is added to the third processing method. For this reason, contents similar to that of the third processing method will be omitted. The width of the area will be illustrated by using the width in the X direction and the width in the Y direction.

As illustrated in FIG. 10A, in a case where an area of the fingertip contacting the operation panel 110 is relatively large, if the fingertip contacting the operation panel 110 travels along an arrow (2) from the outside of the operation area 111, the position detected by the position detector 132 at the outer edge 111E of the operation area 111 may be displaced. In other words, the positional deviation may occur.

However, as illustrated in FIG. 10B, in a case where the area in which the fingertip contacts the operation panel 110 is relatively small, if the fingertip contacting the operation panel 110 travels along an arrow (3) from the outside of the operation area 111, the position detected by the position detector 132 at the outer edge 111E of the operation area 111 is not appreciably.

This is because in a case where the area in which the fingertip contacts the operation panel 110 is relatively small, the position detected by the position detector 132 is less likely to be displaced in relation to the pitch of the intersections 121 in the X direction and the Y direction than in a case where the area in which the fingertip contacts the operation panel 110 is relatively large.

Figure 10C:
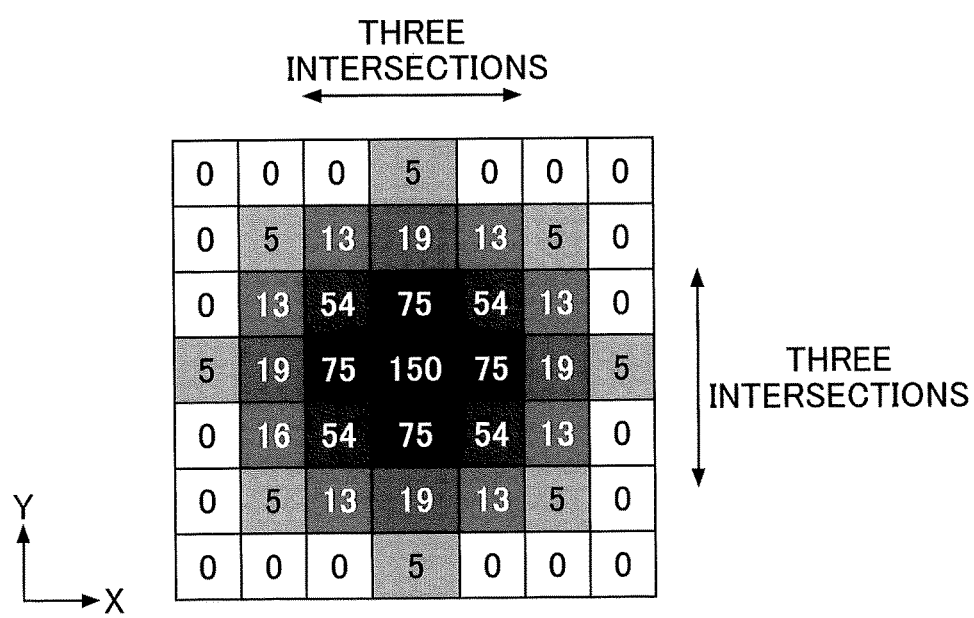
FIG. 10C illustrate thresholds of the width.

The widths of the fingertip contacting the operation panel 110 may be determined, for example, as follows. For example, as illustrated in FIG. 10C, in a case where distributions of the capacitances radially spreading about the peak value (150) is obtained, the widths of the fingertip may be determined as widths corresponding to number of the intersections 121 in the X direction and the Y direction where the capacitances of the two neighboring intersections 121 are greatly changed. In determining the widths of the fingertip in this manner, a threshold value of the capacitances may be used as an example. Here the threshold value is 50.

In FIG. 10C, the capacitances of the intersections 121 neighboring the intersection 121 providing the peak value (150) are 75 and 54. These capacitances are greater than or equal to the threshold value (50). However the capacitances of the intersections 121 located at a second intersection over from the intersection 121 providing the peak value (150), i.e., neighboring intersections of the neighboring intersections of the intersection providing the peak value (150), are 5, 13, and 19. These capacitances are less than the threshold value (50).

In such a case, the width of the fingertip may be determined to be three times the width of the intersection 121.

Figure 11:
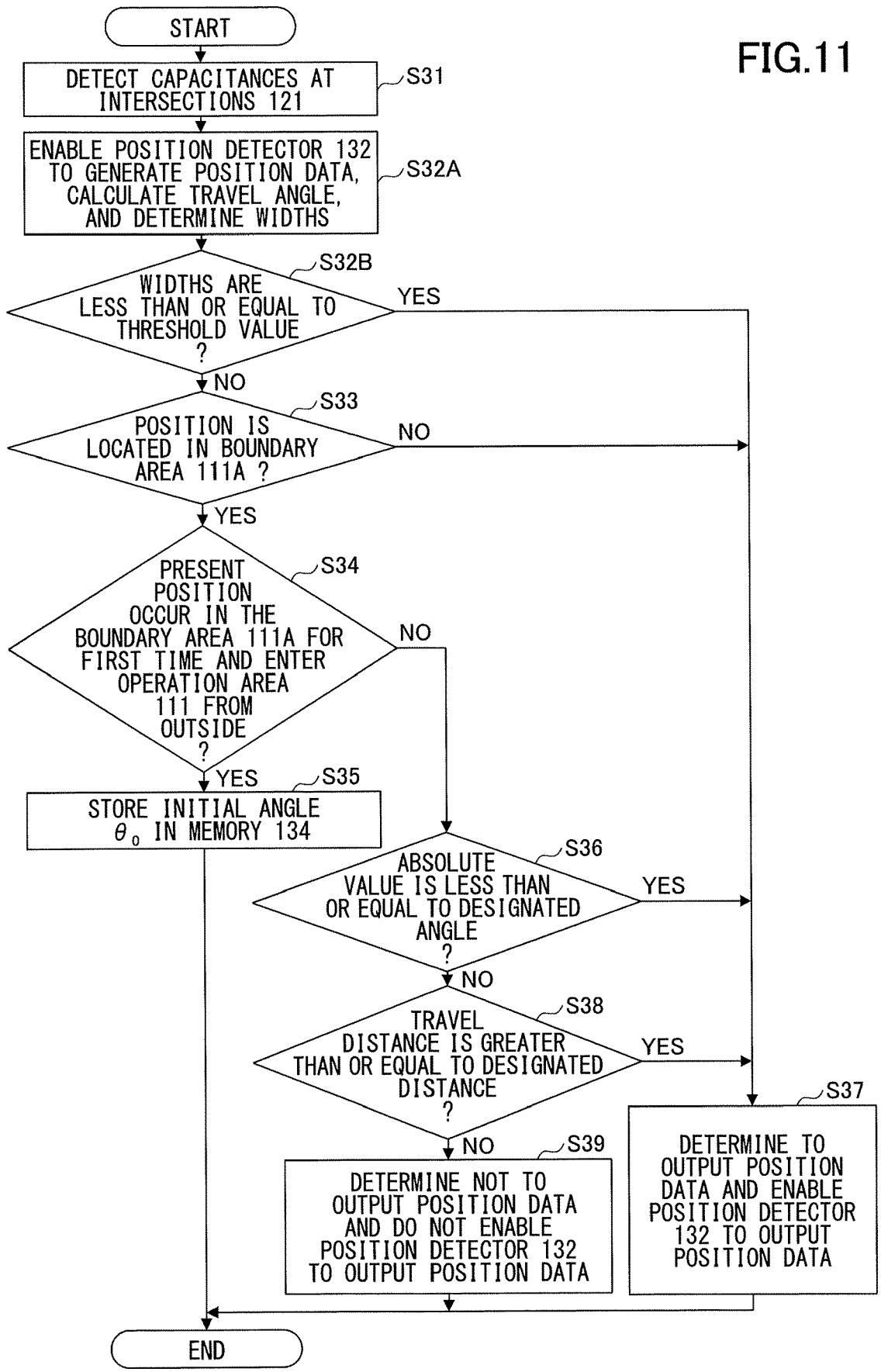
FIG. 11 is a flowchart illustrating the processing of a fourth processing method.

FIG. 11 is a flowchart illustrating the processing of the fourth processing method. The flow illustrated in FIG. 11 is different from that of the third processing method illustrated in FIG. 9 by changing step S32 to step S32A, and adding step S32B after step S32A. Step S32B is followed by steps S33 to S39. For this reason, differences between the fourth processing method and the third processing method will be mainly described below.

As the processing starts and the position detector 132 detects the capacitances at each of the intersections 121 in step S31, the determiner 133 enables the position detector 132 to generate the position data, calculates the travel angle, and determines the widths of the fingertip (step S32A).

The process of step S32A includes the process of measuring the widths of the fingertip in addition to the process of step S32 illustrated in FIG. 9.

The determiner 133 determines whether the widths of the fingertip determined in step S32A are less than or equal to the threshold value (a width threshold value) of the fingertip stored in the memory 134 (step S32B).

If the determiner 133 determines that the widths of the fingertip are less than or equal to the threshold value (S32B: YES), the flow proceeds to step S37. If the widths of the fingertip are less than or equal to the width threshold value, the positional deviation is unlikely to occur even at the outer edge 111E.

If the determiner 133 determines that the widths of the fingertip are not less than or equal to the threshold value (S32B: NO), the flow proceeds to step S33. In a case where the widths of the fingertip are not less than or equal to the width threshold value, i.e., the widths are relatively wide, the positional deviation may occur even at the outer edge 111E. Therefore, the fourth processing method performs the processes of steps S33 to S39 in a manner similar to the third processing method in order to determine whether to output the position data.

As described above, the fourth processing method further includes the process of outputting the position data on the outer edge 111E in a case where the widths of the fingertip are less than or equal to the threshold value (the width threshold value) in addition to the third processing method.

Therefore, the position outputting device 100 can output the position data even if the fingertip is located near the outer edge 111E of the operation area 111.

Accordingly, it is possible to provide the position outputting device 100 that can be used conveniently.

While the position outputting device of an exemplary embodiment of the present invention is described, the present invention is not limited to the specifically disclosed embodiments, and various modifications and modifications can be made without departing from the scope of the claims. As an example, although it is described that, in the disclosed embodiments, the position data is not output in the designated cases, the present invention is assumed to also include an embodiment for outputting that the position data is invalid instead of not outputting the position data.

Although the present invention is described with reference to the embodiments in which the capacitances, as illustrated in FIGS. 3A to 3C, 5A, and 10C, are obtained from the intersections 121 formed by the electrodes 120A extending in the X direction and the electrodes 120B extending in the Y direction, as illustrated in FIG. 1, configuration of electrodes of the present invention are not limited to the electrodes 120A and 120B. Any type of electrodes that can detect an approach and/or a touch performed by the object may be applied.

In the above description, position outputting device according to embodiments are described. However, the present invention is not limited to the embodiments specifically disclosed. A person skilled in the art may easily achieve various modification and changes without departing from the scope of the present invention.

The other objects, features, and benefits of the present application may become further clear by referring to the accompanying drawing and embodiments described above.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present invention has been described in detail, it should be understood that various changes, substitutions, and alterations could be made hereto without departing from the sprit and scope of the invention.

What is claimed is:

1. A position outputting device comprising:
a plurality of sensing electrodes disposed along an operational surface operated by an object, the operational surface having an operational area, the operational area having a boundary area and an inner area, the boundary area being located within a designated range from an outer edge of the operational area, the inner area being surrounded by the boundary area;
a position detector configured to detect a position where the object approaches or touches the operational surface based on capacitances obtained in a plurality of sections defined by the plurality of sensing electrodes, the sections including first sections and second sections, the first sections being located in the inner area, the second sections being located in the boundary area;
an output terminal configured to output position data representing the position; and
a determiner configured to determine whether to output the position data from the output terminal, the determiner determining not to output the position data from the output terminal in response to a peak value of the capacitances being detected in one of the second sections, and the determiner determining to output the position data from the output terminal in response to the peak value being detected in one of the first sections and the difference between the peak value detected in the one of the first sections and the capacitance detected in one of the second sections neighboring the one of the first sections being greater than or equal to a predetermined value.

2. The position outputting device as claimed in claim 1, wherein the determiner determines to output the position data from the output terminal in response to a minimum difference among a plurality of differences between a plurality of capacitances detected in the second sections neighboring the one of the first sections and the peak value being greater than or equal to the predetermined value.

3. The position outputting device as claimed in claim 1, wherein the outer edge of the operational area is circular.

4. A position outputting device comprising:
a plurality of sensing electrodes disposed along an operational surface operated by an object;
a position detector configured to detect a position where the object approaches or touches the operational surface based on capacitances obtained in a plurality of sections defined by the plurality of sensing electrodes;
an output terminal configured to output position data representing the position; and
a determiner configured to determine whether to output the position data from the output terminal, the determiner determining not to output position data from the output terminal in response to a difference between a sum and a weighted average value being greater than a predetermined value, the sum being obtained by adding a peak value and a designated number of capacitances, the peak value being obtained in a first section among the sections, the designated number of capacitances being obtained respectively in the designated number of second sections neighboring the first section among the sections, the weighted average value being obtained by adding the sum of a previous control cycle and the sum of a current control cycle with a designated weight with respect to the sum of the last control cycle and the sum of the current control cycle, and the determiner determining to output the position data from the output terminal in response to the difference being less than or equal to the predetermined value.

5. The position outputting device as claimed in claim 4, wherein the predetermined value becomes greater in accordance with the designated weight of the sum of the previous control cycle being greater relative to the designated weight of the sum of the current control cycle.

6. A position outputting device comprising:
a plurality of sensing electrodes disposed along an operational surface operated by an object, the operational surface having an operational area, the operational area having a boundary area, the boundary area being located within a designated range from an outer edge of the operational area;
a position detector configured to detect a position where the object approaches or touches the operational surface based on capacitances obtained by the sensing electrodes;
an output terminal configured to output position data representing the position; and
a determiner configured to determine whether to output the position data from the output terminal, the determiner determining not to output the position data from the output terminal in response to difference between a first angle and a second angle being greater than a predetermined value, the first angle representing a direction from a first position represented by the position data to a center of the boundary area, the first position being located at the outer edge of the operational area, the second angle representing a direction in which a position represented by the position data travels from the first position to a second position within the boundary area, and the determiner determining to output the position data from the output terminal in response to the difference being less than or equal to the predetermined value.

7. The position outputting device as claimed in claim 6, wherein the position detector detects the position where the object approaches or touches the operational surface based on the capacitances in a plurality of sections defined by the plurality of sensing electrodes, the sections including first sections and second sections, the first sections being located in an inner area, the second sections being located in the boundary area, the inner area being surrounded by the boundary area, and wherein the determiner determines not to output the position data from the output terminal in response to a first width in a first axial direction and a second width in a second axial direction of the object being greater than designated widths, respectively, and the difference being greater than the predetermined value, the first width and the second width being detected based on the capacitances, and wherein the determiner determines to output the position data from the output terminal in response to the difference being less than or equal to the predetermined value.

8. The position outputting device according to claim 7, wherein the determiner determines to output the position data from the output terminal in response to a travel distance of the position data being greater than or equal to a designated distance, in a case in which the difference is greater than the predetermined value.

9. The position outputting device as claimed in claim 6, wherein the determiner determines not to output the position data from the output terminal in response to a difference between a third angle and the second angle being greater than the predetermined value, in a case in which the difference between the first angle and the second angle is less than or equal to the predetermined value, the third angle representing a direction in which the position data travels from the second position to a third position within the boundary area.

10. The position outputting device according to claim 9, wherein the determiner determines to output the position data from the output terminal in response to a travel distance of the position data being greater than or equal to a designated distance, in a case in which the difference between the first angle and the second angle is less than or equal to the predetermined value and the difference between the third angle and the second angle is greater than the predetermined value.

11. The position outputting device according to claim 6, wherein the determiner determines to output the position data from the output terminal in response to a travel distance of the position data being greater than or equal to a designated distance, in a case in which the difference is greater than the predetermined value.

12. The position outputting device as claimed in claim 6, wherein the outer edge of the operational area is circular.

* * * * *